STORED DATA PROTECTION SYSTEM

Filed Oct. 27, 1964 2 Sheets-Sheet 1

INVENTOR.
JOHN C. SIMS, JR
BY Kenway, Jenney & Hildreth
ATTORNEYS

Sept. 5, 1967 J. C. SIMS, JR 3,340,539

STORED DATA PROTECTION SYSTEM

Filed Oct. 27, 1964 2 Sheets-Sheet 2

INVENTOR.
JOHN C. SIMS, JR.
BY Kenway, Jenney & Hildreth
ATTORNEYS

United States Patent Office 3,340,539

Patented Sept. 5, 1967

3,340,539

STORED DATA PROTECTION SYSTEM

John C. Sims, Jr., Sudbury, Mass., assignor to Anelex Corporation, Boston, Mass., a corporation of New Hampshire Filed Oct. 27, 1964, Ser. No. 406,768
12 Claims. (Cl. 346—74)

Figure 1A:
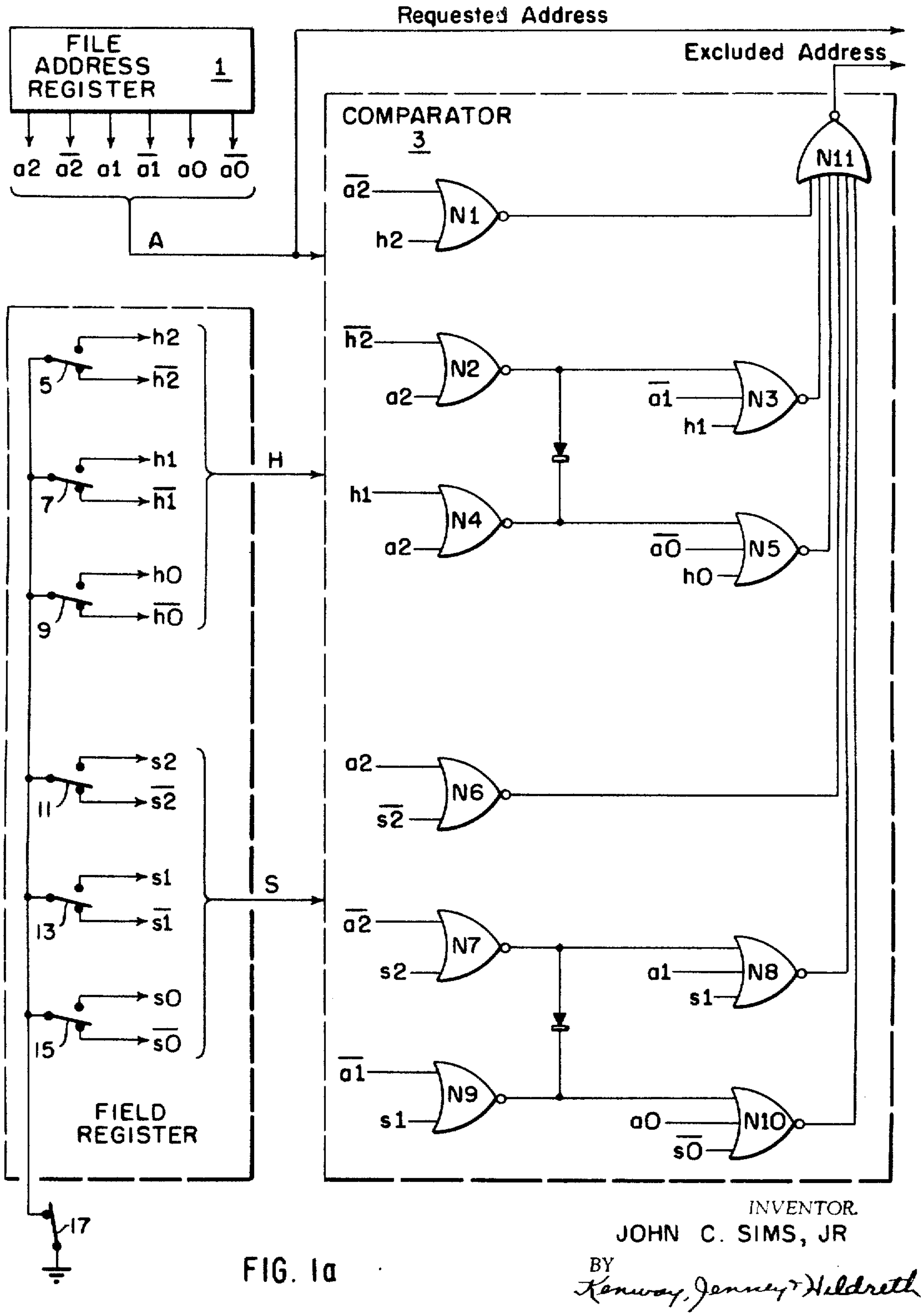

My invention relates to memory accessing, and particularly to novel apparatus for preventing the entry of information into selected memory addresses in a storage system.

An addressable information storage system such as a magnetic disc or drum file, or the like, is commonly required to store two classes of information. The first class of information is essentially transient in nature, such as data in process of being sorted or collated or otherwise operated on, working inventories, and the like. The second class of information commonly stored is basic data of a relatively permanent nature. For example, mathematical reference tables, programs, tax tables and capital inventory records are frequently stored for use over relatively long periods of time. In the normal operation of such a storage system, transient data is continuously altered, whereas basic data cannot be altered without disabling the system for its intended purpose. However, program or computing errors in processing transient data may occasionally result in entering information at an incorrect address, thereby destroying basic data. It is the object of my invention to provide security for basic data without interfering with the alteration of transient data.

While various arrangements are known for entering information into and retrieving information from an addressable storage system, in general a code is registered defining the address of a unit storage domain in the system, and apparatus controlled by the code connects an information source to store information in the selected domain. The parameters defining the address depend on the nature of the storage domain; in an electronic recirculating storage system, an address might be specified in terms of a relative entry time, as determined, for example, by a clock pulse count. In an electromechanical system such as a disc or drum file or the like, a unit storage domain comprises at least a portion of at least one storage track, and is located by an address defining the selected domain in terms of such parameters as the shaft angles of a disc or drum at which the record track begins and ends, the position of read-write head positioning mechanism with respect to the surface of the drum or disc, and the identity of the read-write head if more than one head is employed. This address is normally entered into a file address register, and when such an address has been entered in the address register, suitable positioning and switching means are conditioned to move the selected read-write head to the appropriate track location, and connect the selected head to either a read or a write amplifier by means of which information is exchanged with the file. In accordance with my invention, no change is made in the apparatus for reading from the file, but apparatus is provided for inhibiting entry of information into the file at any selected range of addresses. Briefly, in a typical embodiment of my invention means are provided for registering a code defining a field which it is desired to exclude from alteration, as in the form of high order and low order field boundary addresses, and apparatus is provided for inhibiting the entry of information at any address within this field. Registration of these extremes of the field or fields to be excluded may be electronic or mechanical, but for example may be in the form of a series of manually operable switches. Another manner in which the excluded field or fields may be defined is particularly adapted for use in random access disc files of the type utilizing interchangeable sets of discs mounted in a case or housing. Each such case may be provided with apertures in a convenient location on its surface to cooperate with apparatus on the body of the disc file in the form of means such as spring loaded arms, which will pass through the housing or not, depending on whether a hole is present at that location or not, and operate contacts to set into the apparatus the desired excluded field boundary addresses. In a preferred embodiment of the invention, whatever the structure of the apparatus used for registering the excluded fields, the highest address in an excluded field is entered as its complement, and the lowest ordered address is entered directly, with corresponding modifications of the circuit structure to accommodate this mode of entry. By this arrangement, any failure of the registration apparatus which results in the failure to enter a logic 1 bit in an address will result in the enlargement of the excluded field, rather than a contraction of the excluded field which might cause permanent data to be altered.

The manner in which the apparatus of my invention is constructed, and its mode of operation, will best be understood in the light of the following detailed description, together with the accompanying drawing, of a preferred embodiment thereof.

Figures 1B, 2:
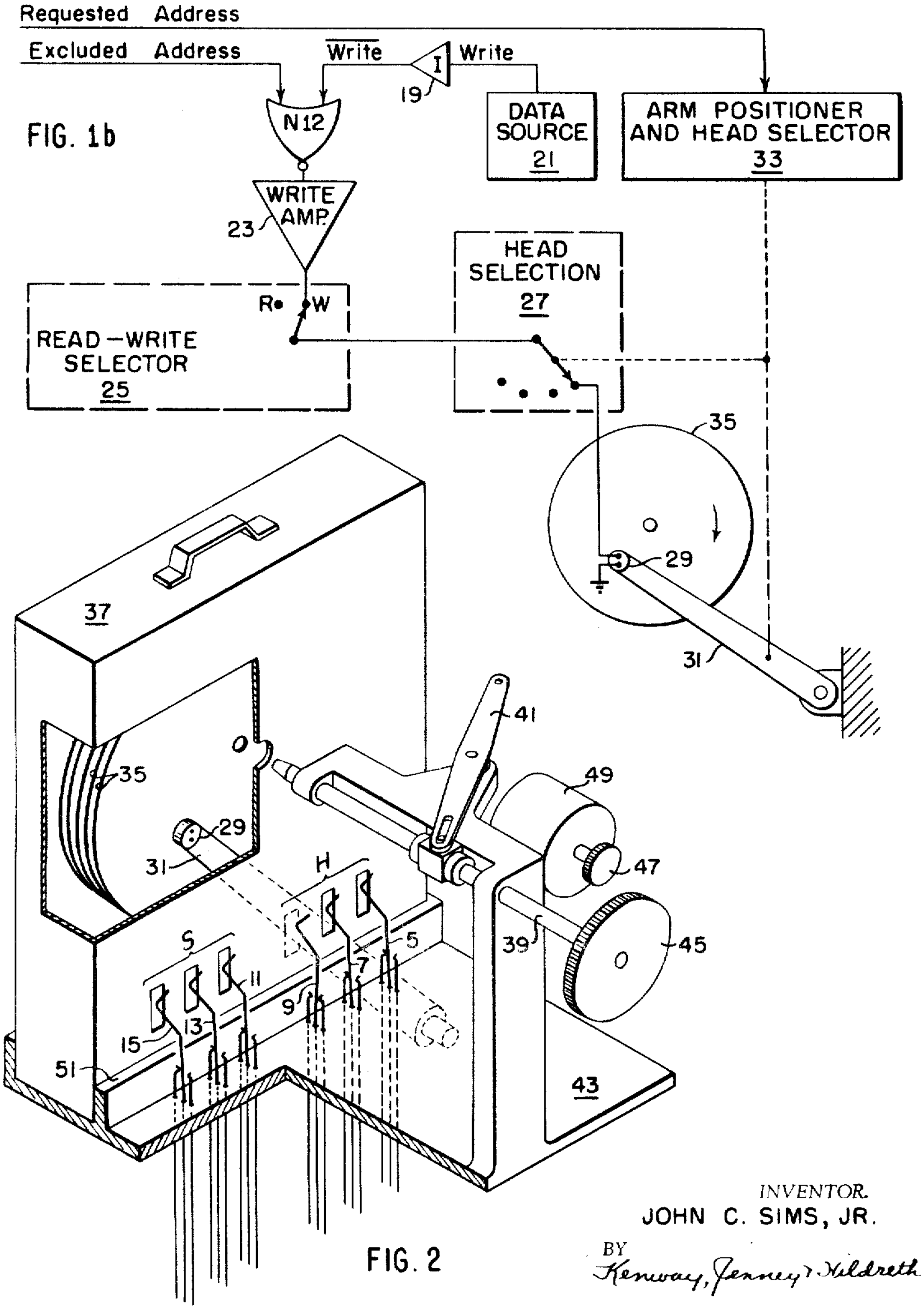

In the drawing,

FIGS. 1*a* and 1*b*, when placed horizontally side by side with FIG. 1*a* at the left, comprise a schematic wiring diagram of a preferred embodiment of the invention; and FIG. 2 is a schematic perspective sketch, with parts broken away, of an embodiment of my invention adapted for use with removable disc sets.

Referring to FIGS. 1*a* and 1*b*, I have shown somewhat schematically various portions of a conventional random access disc file necessary to illustrate the connection of that apparatus with the additional apparatus of my invention. This conventional apparatus includes a file address register 1, of any conventional construction, into which a requested file address for reading or writing may be entered. For example, the address register 1 could consist of a series of flip-flops, which could be set manually or automatically to a desired address code. For purposes of illustration, I have indicated a 3 bit code having a maximum of eight combinations. In general, a larger number of bits would be included in the file address, but only three are needed to illustrate the principle of the invention. As illustrated, the file address register 1 is provided with a group of output leads to produce the signals defining the bits of the requested address A and their complements. Specifically, $a0$ represents the lowest ordered bit of the address, $\overline{a0}$ is its complement, $a1$ and $\overline{a1}$ represent the next highest ordered bit and its complement, and $a2$ $\overline{a2}$ represent the highest ordered bit and its complement. To avoid carrying all of these leads throughout the drawings, they have been collectively and schematically shown as a cable, and where their individual connections are shown, they are identified by the identifying symbol associated with the output lead of the address register 1. These output leads are connected to a comparator 3, which also receives leads defining a high order address H and a low order address S of an excluded field. Since this field will be within the total possible field of addresses A, both the high order address H and the low order address S are represented by 3 bit codes. These codes may be manually registered by selective positioning of switches 5, 7 and 9 for the high order address H and 11, 13 and 15 for the low order address S. The bits of these addresses and their complements are represented by the symbol *h* followed by a numerical suffix and a bar to designate the complement, and the low order addresses are similarly indicated by the symbol *s* followed by a numerical suffix and a bar indicating the complement. Connections of these leads elsewhere in the drawing are represented in the manner described above in connection with the leads defining address A. It will be apparent that considered collectively, the switches 5, 7, 9, 11, 13 and 15 comprise a field register for storing a code defining a field to be excluded. So considered, it will be apparent that the division of this register into high and low ordered address components is merely a convenience, and not a necessity, since any code having a distinctive combination for each field to be excluded could be employed, if desired, with suitable attendant modifications of the comparator circuits, to be described. In addition, while the apparatus to be described is capable of excluding any contiguous sub-field in the available field of addresses, simplified apparatus could be employed if provision was made only for the exclusion of a sub-set of the available sub-fields not requiring as many code bits to identify.

As indicated, the armatures of the excluded field defining switches may be connected together and thence to ground, through a switch 17. The switch 17 is optional, but may be provided if desired to permit the field register to be disabled at times when it may be desired to enter basic data in a field that would otherwise be excluded.

The comparator 3 comprises a group of conventional NOR gates N1 through N11, which may be of the type shown and described in my copending application Ser. No. 358,853 for Variable Word Length Internally Programmed Information Processing System, filed on Apr. 10, 1964, and assigned to the assignee of this application. As will be apparent to those skilled in the art, other suitable NOR gate constructions could be employed, and AND and OR gates could be used by suitable application of known logical transformation theorems. Basically, the apparatus is arranged to produce an output ground level labelled "excluded address" when the requested address A is not greater than the high ordered address H nor less than the low ordered address S. In other words, this output is produced when A is less than or equal to H and A is greater than or equal to S. This output condition is produced by the NOR gate N11 when no input ground level is applied to any of its six input terminals.

The determination that A is not greater than H is made by the gates N1, N2, N3, N4 and N5. It will be apparent that A will be greater than H if $a\mathbf{2}$ is logic 1 and $h\mathbf{2}$ is logic 0. To detect this condition, the leads $\overline{a\mathbf{2}}$ and $h\mathbf{2}$ are connected to the input terminals of the NOR gate N1. This gate will accordingly produce an output when both of these input conditions are logic 0, which may either be represented by an open circuit or by a suitable negative potential depending on the construction of the file address register 1. The gate N1 will then produce an output ground level to disable the gate N11. If the gate N1 does not produce an output signal, and if the leads $h\mathbf{2}$ and $a\mathbf{2}$ are at the same potential, it becomes relevant what the relation is between the next highest ordered bits in the address A and the address H. To ensure that this comparison is made only when needed, the gate N2 is provided and its two input terminals are connected to the leads $\overline{h\mathbf{2}}$ and $a\mathbf{2}$. Thus, the gate N2 will produce an output only when the highest ordered bit of A is 0 and the highest ordered bit of H is 1. This output is applied to the gates N3 and N4. When a ground potential appears at the output of the gate N2, the gate N3 is disabled. At other times, it makes a comparison of the second ordered bits in the addresses A and H and receives for this purpose two inputs $\overline{a\mathbf{1}}$ and $h\mathbf{1}$. Thus, the gate N3 will produce an output at ground level disabling the gate N11 when and only when higher ordered bits of the address H have not been found to be greater than corresponding bits of the address A, and $a\mathbf{1}$ is logic 1 and $h\mathbf{1}$ is logic 0, indicating that A is greater than H.

At any stage in the comparison process, it is necessary to compare the associated bits of the A and H addresses only if higher ordered bits were equal. If the A address was found to be greater than the H address in a higher ordered comparison, a higher ordered gate such as N1 would have produced a ground level input to disable the gate N11. Accordingly, it is immaterial under these circumstances whether or not any lower ordered gate such as the gates N3 or N5 produces an output, and no apparatus is provided to inhibit such outputs. However, if any higher ordered bit in the H address is greater than the corresponding bit in the A address, it is necessary to prevent any lower ordered gate such as N3 or N5 from producing an output. For this purpose, each stage is provided with a gate such as the gates N2 and N4 which compare the next higher ordered bits of the H and A addresses, and to produce an output ground level inhibiting the associated gates such as N3 if the next higher ordered pair of bits comprise a 1 in the H address and a 0 in the A address. Thus, the gate N2 receives the inputs $\overline{h\mathbf{2}}$ and $a\mathbf{2}$, and the gate N4 receives the inputs $\overline{h\mathbf{1}}$ and $a\mathbf{1}$. To take care of higher ordered bits in which the H bit may be higher than the corresponding A bit, the results of each such comparison as made by the gate N2 for example, are carried down to the next stage, as through a diode D1. Thus, an input ground level will be applied to the gate such as N5 when either its associated gate N4 produces a ground level or some higher orderd gate has produced an output ground level. For more bits, the gate N4, for example, would have its output terminal connected through another diode such as D1 to the output terminal of the next stage input gate.

Further security may be obtained by entering the H address as its complement, producing a logical conversion which could be compensated for by simply connecting the H leads complementing those shown to the gates N1, N2, N3, N4 and N5. By this arrangement, any contact such as the contacts of the switches 5, 7 and 9 which failed to close would result in the high ordered bound of the field to be excluded to be moved away from the low ordered bound, protecting the desired information.

Comparison to determine that the A address is not less than the lower ordered address S of the excluded field is made by a set of gates N6, N7, N8, N9 and N10, functioning exactly the same as the set of gates N1 through N5 just described except that the places of the S and A address bits are interchanged such that one of the gates N6, N8 and N10 will disable the gate N11 if the low ordered address S is greater than the requested address A. As described above, each of the comparison stages except that for the highest ordered bit in the compared addresses is provided with an input gate such as N7 which has an output terminal connected to an input terminal of the output gate such as N8, and also connected through a diode such as D2 to the output terminal of the next succeeding input gate such as N9.

The output of the comparator gate N11, labelled "excluded address" is applied to one input terminal of a NOR gate N12, serving as a data switch. The second input terminal of the NOR gate N12 is supplied by an inverter 19 from a suitable data source 21, such as a magnetic tape reader or the like. The output of the data source has been labelled "write," and the output of the inverter 19 "$\overline{\text{write}}$," to indicate that when a data pulse occurs directing the recording of a bit of information, there will be no input to the "$\overline{\text{write}}$" input terminal of the gate N12, and if there is no "excluded address" signal present, the gate N12 will then cause the ground level output to be applied to a conventional "write" amplifier 23 to control the recording of data. The invention is not limited to use with any particular mode of recording, but for example the data source 21 could provide modulating signals such as those appearing at the output terminal of the gate OR1 in FIG. 1 of my copending U.S. application Ser. No. 341,969, filed Feb. 3, 1964, now U.S. Patent No. 3,299,414, for Phase Modulated Magnetic Recording and Reproducing System, and assigned to the assignee of this application. The "write" amplifier 23 could correspond to the "write" amplifier 7 in FIG. 1 of that application.

The output of the "write" amplifier 23 is applied through any suitable read-write selection apparatus 25, here shown as a switch having a "write" position W and a "read" position R, and through a suitable head selection means 27, here shown as a manual switch for selecting one of several heads on a disc file, to a recording head 29 located on a positioning arm 31 for movement to a desired track on a recording surface such as the surface of a recording disc 35, as shown. As schematically indicated, the position of the arm 31 and the selection of the desired head are made by conventional arm positioner and head selector means 33 in response to the requested address supplied from the file address register 1 in any conventional manner known to those skilled in the art, which it is not deemed necessary to describe in detail. For example, apparatus suitable for positioning the arm 31 is shown and described in copending U.S. application Ser. No. 273,694, now U.S. Patent No. 3,298,008, filed on Apr. 17, 1963 by Byron Smith and Robert R. Reisinger for Head Positioning Apparatus For Random Access Disc Memory System and assigned to the assignee of this application. In practice, head selection would be accomplished by electronic switching by conventional gating techniques under the control of the file address register.

The mode of operation of the apparatus of the embodiment just described will be illustrated by assuming that an excluded field is defined by the high ordered address 101 and the low ordered address 011. Thus, the addresses to be excluded are binary 3, 4 and 5. These addresses would be entered in the apparatus of FIG. 1*a* by positioning the switch 5 to apply ground to the lead $h2$, the switch 7 to apply ground to the lead $\overline{h1}$, and the switch 9 to apply ground to the lead $h0$. Similarly, the switch 11 would be positioned to apply ground to the lead $\overline{s2}$, the switch 13 would be positioned to apply ground to the lead $s1$, and the switch 15 would be positioned to apply ground to the lead $s0$. In this condition of the apparatus, regardless of the requested address stored in the file address register 1, the gates N1, N5, N6 and N8 cannot produce output ground potentials disabling the gate N11, because each of these gates has one input terminal to which ground is applied. Assuming that the excluded address 100 is stored in the file register 1, the arm positioner and head selector means 33 would position the arm 31 to the requested address, and the head selection means 27 would connect the selected head 29 to the write amplifier 23 over the read-write selection means 25 contact closed in the "write" position W. Since the lower ordered address L is greater than the requested address in the highest ordered bit, there should be no output from the gate N10. Since the bit $a2$ in the requested address 100 is a logic 1, there will be no input to the $\overline{a2}$ input terminal of the gate N7. Since the corresponding bit $s2$ in the address S is not present, the gate N7 will produce an output ground potential causing current to flow through the diode D2 and grounding the input terminal of the gate N10, causing it to be disabled. The gates N6 and N8 will produce no outputs for the reasons given above.

Since the requested address is less than the high ordered address 100, the gate N3 should produce no output. With the bit $a2$ in the requested address present, the gate N2 will be disabled. However, since the bit $\overline{a1}$ has a truth value of logic 1, the corresponding bit in requested address being 0, the gate N3 will also be disabled and no input ground will be applied to the gate N11. The gate N11 will accordingly produce the signal "excluded address," disabling the gate N12 and preventing any data from the data source 21 from being entered in the file.

As a second example, assume a requested address 110, higher than the highest ordered address of the excluded field. With this address stored in the address register 1, the gate N2 will be disabled because there will be no input to its input terminals. Since the $a1$ bit in the requested address is logic 1, there will be no input to the terminal $\overline{a1}$ of the gate N3. Similarly, there will be no input to the input terminal $h1$ of this gate, because the bit $h1$ is logic 1. Accordingly, the gate N3 will produce an output ground to disable the gate N11, and the excluded address signal will not be present, permitting the gate N12 to enter data into the file at that address. The mode of operation of the apparatus with various other excluded fields of requested addresses will be apparent from these examples.

Referring now to FIG. 2, I have shown quite schematically a disc file of the removable disc set type in which a group of removable discs 35 are mounted in a suitable portable housing 37. A disc file of this type is currently marketed as the ANelex Model 80 Disc File. For removal or insertion, a mandrel schematically shown at 39 is retracted, as by actuation of a suitable lever 41 mounted on the frame 43 of the machine, at the same time disengaging driving means here shown as gears 45 and 47, the gear 45 being fixed to the mandrel and the gear 47 being driven by a conventional motor 49. At these times, the arms such as the arm 31 carrying heads such as the head 29 are swung out of the way. When it is desired to insert the set of discs such as 33 into the file, the housing 37 is put into position, and the mandrel 39 is advanced to pick up the discs by means of suitable apertures in their centers, releasing them from suitable supports in the housing 37, not shown, and thereafter to rotate them by actuation of the motor 49.

In accordance with my invention, one or more excluded fields of data on the discs 33 may be defined by one or more high ordered addresses H and corresponding low ordered addresses S of the fields, registered on a suitable portion of the wall of the housing 37 by means of apertures. These apertures would correspond to a 0 bit in the H address, this address being preferably entered as its complement as described above, and a low ordered address defined by apertures for each logic 1 bit in the address. Located on the frame 43, in positions corresponding to locations at which apertures may be present in the housing when it is in operating position, are actuating means for operating contacts to one of two positions in dependence on the presence or the absence of an aperture. As shown, these means may simply comprise a series of spring loaded arms formed as extensions of the armatures of the switches 5, 7, 9, 11, 13 and 15, such that the switch 15, for example, will be closed to the left as shown to register logic 1 when an aperture is present, and closed to the right to register logic 0 when no aperture is present. Alternatively, the actuating means may take the form of spring-loaded pins located to actuate the armatures of the switches such as 5 to a first or a second position in dependence on the presence or absence of an aperture. By this arrangement, when the housing 37 is brought into operating position on the frame 43 of the machine, the file is selectively conditioned to enter information only in the non-excluded addresses, without requiring any special equipment on the fixed portion of the file. This facility is particularly desirable in view of the extra security it provides for the basic data stored on the discs, in that no change in the high and low ordered addresses of the excluded fields can be made without drilling holes in the housing 37. This construction is particularly desirable where it is contemplated that disc sets will be made up in standard form for use in particular environments, and in which standard fields of basic data are entered to handle specific problems. Users of such disc sets would not necessarily or even usually have the facilities for reconstituting the basic data if it became lost through error.

While I have described my invention with reference to the specific details of particular embodiments thereof, various changes and modifications will be apparent to those skilled in the art upon reading my description, and such can obviously be made without departing from the scope of my invention.

Having thus described my invention, what I claim is:

1. In combination, memory means comprising a plurality of addressable storage domains for storing information, an address register for storing the address of a domain in said memory means, switching means settable to first and second states, means controlled by said address register and said switching means in its first state for entering information into a domain in said memory means corresponding to the address stored in said address register, a field register for storing a code identifying a field of addresses corresponding to domains in said memory means into which information is not to be entered, and comparator means controlled by said field register and said address register for setting said switching means to its first or its second state according as the address in said address register is out of or in said field, respectively.

2. The apparatus of claim 1, in which said field register comprises first registering means for storing a code defining an upper bounding address of said field and second registering means for storing a code defining a lower bounding address of said field.

3. Data protection apparatus for an information storage system comprising an address register, memory means comprising a predetermined field of adressable storage domains, and means comprising a communication channel controlled by said address register for entering information into a domain in said memory means selected by the address register, said apparatus comprising, switching means in said communication channel actuable to a first state in which said channel is open and a second state in which said channel is closed, a field register for storing a code defining a field of addresses within said predetermined field, and comparing means controlled by said field register and said address register for actuating said switching means to its first or its second state according as the address stored in said address register is outside or inside of the field defined by the code stored in said field register, respectively.

4. The apparatus of claim 3, in which said field register comprises first registering means for storing a code defining an upper bounding address of said field and second registering means for storing a code defining a lower bounding address of said field.

5. In combination, a magnetic storage medium having at least one recording surface, a recording head mounted adjacent said recording surface for movement over a predetermined range, means for moving said storage medium at constant speed relative to said head to cause said head to traverse a path on said surface determined by the position of said head within said range, a source of information signals, switching means actuable to first and second states and operable in its first state to supply signals from said source to said head, field register means for storing a code defining a field of addresses, address register means for storing an address code, positioning means controlled by said address register means for moving said head to a position within said range determined by the address code, and comparator means controlled by said field register means and said address register means for actuating said switching means to its first or its second state according as the address code stored in said address register means is out of or in the field defined by the code stored in said field register means, respectively.

6. The apparatus of claim 5, in which said field register means comprises first registering means for storing a code defining an upper bounding address of said field and second registering means for storing a code defining a lower bounding address of said field.

7. In combination with a random access disc file of the type comprising a frame, a removable set of magnetic recording discs enclosed in a housing detachably secured to the frame, at least one recording head mounted on the frame for movement over a range of recording positions adacent at least one of the discs, an adress register for storing a code defining a recording position of the head in said range, and positioning means controlled by said address register for moving the head to the position corresponding to said address code, a plurality of two-position switches on said frame for representing by their combined positions the upper and lower bounding addresses of a field of addresses in said range, a two-position actuating means mounted adjacent each switch, means resiliently urging each actuating means to a first position for moving the corresponding switch to its second position, a portion of said housing extending between said switches and said actuating means and holding selected ones of said actuating means in their second positions, a set of apertures in said portion through which the remainder of said actuating means move to their first positions, switching means actuable to first and second states, means controlled by said address register and said switching means in its first state for supplying recording signals to said head, and comparator means controlled by said two-position switches and said address register for setting said switching means to its first or its second state according as the address in said address register is out of or in said field, respectively.

8. The apparatus of claim 7, in which said apertures are selected to represent the logical 1's of the lower bounding address and the logical 1's of the complement of the upper bounding address.

9. Data protection apparatus for an information storage system comprising an address register, memory means comprising a predetermined field of storage domains at least partially enclosed in a housing having a wall, and means comprising a communication channel controlled by said address register for entering information into a domain in said memory means selected by the address register, said apparatus comprising, switching means in said communication channel actuable to a first state in which said channel is open and a second state in which said channel is closed, a set of apertures in said wall in an array defining by their number and relative positions a field of addresses in said predetermined field, a set of two-position switches on one side of said wall adacent said array and biased to a first position, an actuating means adacent each switch and biased to extend through said wall and actuate the corresponding switch to its second position where an aperture occurs at the corresponding location in said array, and comparing means controlled by said two-position switches and said address register for actuating said switching means to its first or its second state according as the address stored in said address register is outside or inside of the field defined by said array of apertures.

10. The apparatus of claim 9, in which said apertures are selected and positioned to represent the logical 1's of the lower bounding address of said field and the logical 1's of the complement of the higher bounding address of said field.

11. In combination, an information storage system comprising a storage medium having a plurality of storage locations, a cartridge containing said storage medium, coding means on said cartridge defining a field comprising at least one storage location on said storage medium, information processing means detachably connected to said cartridge and selectively operatively connectible to said storage medium for entering information into and retrieving information from said storage locations, and means controlled by said coding means for inhibiting the operation of said information processing means to enter information in the field defined by said coding means.

12. The apparatus of claim 11, in which said coding means comprises means for defining at least two storage locations designated by a corresponding field of contiguous ordered numbers in terms of the lowest ordered number and the complement of the highest ordered number in the field.

References Cited

UNITED STATES PATENTS

| | | | |
|---|---|---|---|
| 2,817,829 | 12/1957 | Lubkin | 340—174.1 |
| 3,080,548 | 3/1963 | Hagen et al. | 340—146.1 |
| 3,193,800 | 7/1965 | Shoultes | 340—146.1 |

OTHER REFERENCES

"IBM System/360 Principles of Operation," IBM Systems Reference Library, File No. S360–01, Form A22–6821–2, pp. 17 and 70.

BERNARD KONICK, *Primary Examiner.*

A. I. NEUSTADT, *Assistant Examiner.*